June 21, 1938.  E. K. LYNN ET AL  2,121,548
RESERVOIR RELEASE VALVE
Filed March 23, 1937
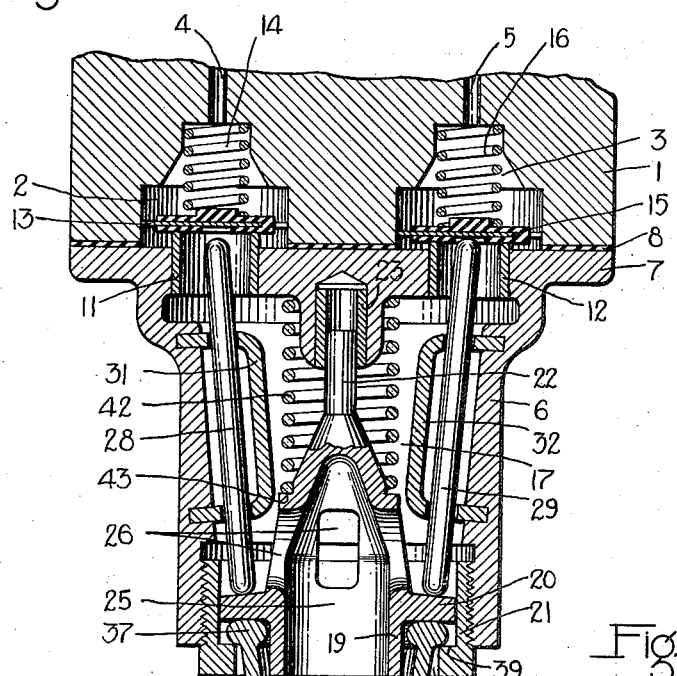
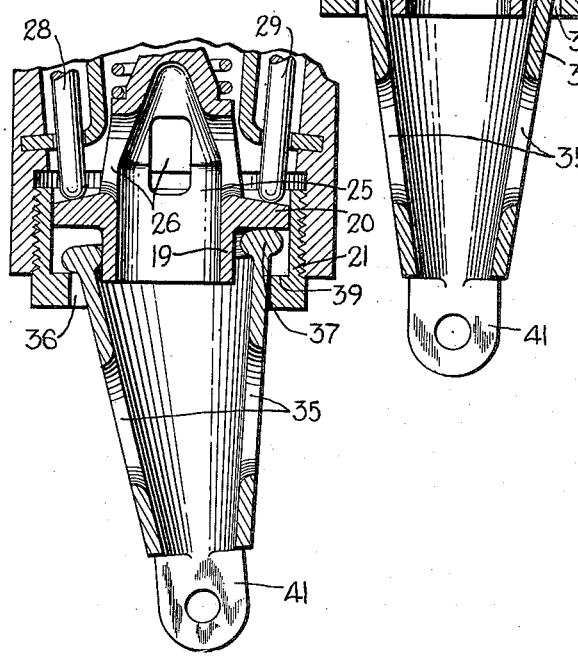
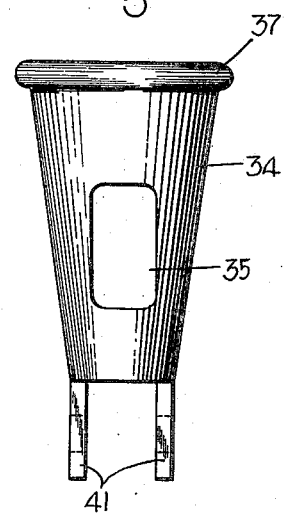
INVENTORS
EWING K. LYNN
WALTER S. ABRAHAM
BY Wm. M. Cady
ATTORNEY Patented June 21, 1938

2,121,548

UNITED STATES PATENT OFFICE 2,121,548

RESERVOIR RELEASE VALVE

Ewing K. Lynn and Walter S. Abraham, East McKeesport, Pa., assignors to The Westinghouse Air Brake Company, Wilmerding, Pa., a corporation of Pennsylvania Application March 23, 1937, Serial No. 132,479

9 Claims. (Cl. 303—80)

This invention relates to valve devices, and more particularly to a reservoir release valve device for a fluid pressure brake apparatus.

In a modern fluid pressure brake equipment for a vehicle, it is customary to provide release valve means for venting fluid under pressure from the storage reservoirs mounted on the car, such as the usual auxiliary and emergency reservoirs, the release valve means being preferably embodied in a single device manually operative from the side of the car to release fluid under pressure first from the auxiliary reservoir and then from both the auxiliary and emergency reservoirs. While it is desirable that a reservoir release valve device of the above type be relatively light in weight and of small size so as to be suitable for mounting on the casing of a brake controlling valve device such as the well known "AB" valve, it is at the same time important that the device be made strong enough to resist the unduly heavy strains and shocks to which it is sometimes subjected by careless trainmen.

One object of our invention is to provide an improved reservoir release valve device embodying the above features of construction.

Due to the exposed position of the reservoir release valve, snow and ice tend to accumulate on portions of the device during cold weather in such a manner as to interfere with the desired operation thereof, and ice may be formed in sufficient quantities around the operating members as to cause breakage of such members if an attempt is made to vent the storage reservoirs.

It is therefore another object of our invention to provide a reservoir release valve device designed to prevent access of water and snow to operating parts thereof so as to avoid the above difficulties.

A further object of the invention is to provide an improved reservoir release valve device of simple and inexpensive construction.

In the accompanying drawing, Fig. 1 is a vertical sectional view of a reservoir release valve device constructed according to our invention; Fig. 2 is a vertical sectional view of the release valve device shown in the discharge position thereof; and Fig. 3 is a side view of the valve operating member shown in Figs. 1 and 2.

Referring to Fig. 1 of the drawing there is provided a casing section 1, which is adapted to be secured in a suitable manner to the usual brake controlling valve device, not shown, and which has formed therein a valve chamber 2 and a valve chamber 3. The valve chambers 2 and 3 may be connected by way of passages 4 and 5 with the emergency and auxiliary reservoirs, respectively, not shown. A casing section 6 is mounted on the casing section 1, the casing section 6 having a flange portion 7 which is adapted to be secured to the lower side of the casing section 1 by suitable means such as bolts, not shown, a gasket 8 being interposed between said casing sections for insuring a tight joint. The uppermost portion of the casing section 6 is provided with a pair of bores within which are mounted a seat bushing 11 extending into the valve chamber 2 and a similar seat bushing 12 which extends into the valve chamber 3.

Disposed in the valve chamber 2 is a poppet valve 13 which is urged into engagement with the seat bushing 11 by the force of a spring 14 interposed between said valve and the casing. Similarly, the valve chamber 3 contains a poppet valve 15 which is normally held in seating engagement with the bushing 12 by the force of a spring 16 interposed between said valve and the casing section 1. The valves 13 and 15 are adapted to control communication between the respective valve chambers 2 and 3 and a central chamber 17 formed within the casing section 6.

Means for actuating the release valves 13 and 15 is disposed in the central chamber 17 within the casing section 6, the means including a longitudinally movable hollow member 19 having formed on the lower portion thereof an annular guide flange 20 which slidably engages the cylindrical wall of a combined fulcrum and guide member or bushing 21 having screw threaded connection with the casing section 6, the uppermost portion of said member 19 forming a centrally disposed guide pin 22 that is slidably mounted in a bushing 23 secured in the casing section 6. Formed within the hollow member 19 is a chamber 25 which is open to the atmosphere and communicates by way of apertures 26 with the chamber 17.

Two similar rods 28 and 29 are provided for transmitting movement of the member 19 to the valves 13 and 15, the rod 28 being so disposed that its lower end rests on the upper surface of the annular guide flange 20 while its upper end extends into operative alignment with the valve 13, and the other rod 29 being similarly arranged with its lower end engaging the flange 20 and the upper end operatively aligned with the valve 15. For maintaining the rod 28 in proper alignment there is provided a guide element 31, which has suitable apertures for receiving the rod and which is firmly secured to the casing section 6, the ends of said element being preferably moulded into said casing section during the original casting operation, as is indicated in the drawing. A guide element 32 is likewise provided for the rod 29 and is formed and secured in place in the same manner as is the guide element 31.

The slidably mounted member 19 is adapted to be actuated by an operating member 34, which is made in the form of a frustum of a cone and has a central aperture at the lower or small end thereof and one or more apertures 35 formed in the side wall thereof. On the upper and larger end of the operating member 34, which extends through a circular opening 36 formed in the member 21, is formed an enlarged annular bead or lip 37. As shown in the drawing, the upper surface of the bead 37 is in operative engagement with the annular flange 20 of the member 19, the enlarged outer portion of the bead being adapted to rest against an annular shoulder 39 formed on the member 21 surrounding the opening 36. It will be noted that the inner surface of the annular bead 37 is only slightly spaced from the adjacent cylindrical wall of the member 19, and that the conical wall of the operating member 34 is spaced from the edge of the opening 76 a relatively greater distance. The operating member 34 is adapted to be moved manually or by means of a lever, not shown, which may be connected to a pair of apertured lugs 41 formed on the outer end of the operating member.

The members 19 and 34 are normally maintained in the position shown in the drawing by a spring 42 which is interposed between and operatively engages the upper wall of the casing section 6 and a shoulder 43 formed on the member 19, it being understood that the rods 28 and 29 are held in engagement with the annular flange 20 by the force of gravity. Although the rods 28 and 29 are preferably of the same length, with the release valve device positioned as shown in Fig. 1 the upper end of the rod 28 is spaced from the valve 13 by a somewhat greater distance than that between the upper end of the rod 29 and valve 15 due to the greater length of the bushing 11 on which the valve 13 is seated. It will also be noted that the rods 28 and 29 are inclined with respect to the vertical axis of the casing 6, so that the upper ends of said rods are farther apart than the lower ends, thus permitting the designing of the casing section 6 with a minimum over all diameter and at the same time with such thickness as to ensure adequate strength.

The reservoir release valve device may be operated to release fluid under pressure from one or both of the storage reservoirs by tilting the operating member 34 in any direction from the position in which it is shown in Fig. 1 of the drawing. Assuming that the operating member 34 is tilted toward the right-hand as illustrated in Fig. 2, the initial movement thereof brings the inner surface of the annular bead 37 at one side of the member into engagement with the lower cylindrical portion of the movable member 19, the operating member 34 then pivoting about that point of engagement with said portion so as to cause the right-hand side of the bead 37 to bear against and shift upwardly the member 19. As the member 19 is thus moved upwardly, the flange portion 20 thereof forces the rod 29 into engagement with the valve 15 and moves the valve away from the seat bushing 12 against the pressure of the spring 16, thereby venting fluid under pressure from the auxiliary reservoir to the atmosphere through the passage 5, chamber 3, past the valve 15, through the bushing 12 and the chamber 17, and thence through the apertures 26 and chamber 25 in the member 19 and through the apertures 35 in the hollow operating member 34.

At the same time the upward movement of the member 19 causes the rod 28 to approach the valve 13, and if movement of the operating member 34 toward the right hand is continued until stopped by engagement of the conical wall of the member 34 with the portion of the member 21 surrounding the aperture 36 as shown in Fig. 2, the rod 28 is operated to lift the valve 13 away from its seat. Fluid under pressure is thus vented from the emergency reservoir by way of the passage 4, the chamber 2, past the unseated valve 13 and through the bushing 11 and the chamber 17 to the atmosphere.

It will be noted that since the annular bead 37 of the operating member has a rounded surface and since there is operating clearance between the members 19 and 34 the bead will have both a rolling and a sliding engagement with the annular shoulder 39 formed on the member 21 and with the member 19 in the manner above described, so as to facilitate proper operation of the release valve device.

From the foregoing it will be apparent that our invention provides a reservoir release valve device of improved design, the elements of which, and in particular the hollow operating member 34, may be made sufficiently strong to avoid breakage while in service, the operating member being also adapted to prevent access of snow or water into the valve device in such a manner as to interfere with its proper operation.

While one illustrative embodiment of our invention has been described in detail, it is not our intention to limit its scope to that embodiment or otherwise than by the terms of the appended claims.

Having now described our invention what we claim as new and desire to secure by Letters Patent, is:

1. In a fluid pressure release valve device, in combination, a casing having a fluid pressure discharge orifice, valve means mounted in said casing and operative to vent fluid under pressure through said orifice, operating means slidably mounted in said casing and adapted to operate said valve means, and a tiltable hollow member provided with one or more apertures and having one end supported in rocking engagement with the portion of said casing adjacent said orifice and in operative engagement with said operating means, said hollow member being operable to actuate said operating means and thereby said valve means for causing fluid under pressure to be vented through the discharge orifice and the apertures in said member.

2. In a fluid pressure release valve device, in combination, a casing having a broad main portion and a substantially cylindrical portion of smaller diameter than said main portion, said cylindrical portion having a chamber formed along the longitudinal axis thereof and open at one end to the atmosphere through a discharge orifice, a plurality of laterally spaced valves mounted in the main casing portion and operative to vent fluid under pressure through said chamber and said orifice, a spring, a movable member slidably mounted in said chamber and yieldingly urged toward said orifice by said spring, a plurality of movable rods disposed within said chamber intermediate said valves and said member, and guide means secured within said cylindrical portion of the casing and adapted to maintain said rods slidably mounted at an angle with respect to the axis of said casing, whereby one end of each rod extends inwardly into operative engagement with said movable member while the other end extends outwardly into operative alignment with one of said valves, said rods being operative to unseat said valves in accordance with movement of said member away from said orifice.

3. In a fluid pressure release valve device, in combination, a casing having a circular discharge aperture and an annular shoulder surrounding said aperture, valve means mounted in said casing and operative to vent fluid under pressure through said aperture, and a hollow operating member in the form of a frustum of a cone and having one or more apertures therein, the larger end of said member being operatively mounted within said shoulder and adapted to operate said valve means, whereby upon movement of said member for operating said valve means fluid under pressure is vented through said discharge aperture and the apertures in said member to the atmosphere.

4. A fluid pressure release valve device comprising, in combination, a casing having a circular discharge orifice and an annular shoulder surrounding said orifice, valve means mounted within said casing and operative to vent fluid under pressure through said orifice, means including an apertured element slidably mounted in said chamber for operating said valve means, and a hollow member in the form of a frustum of a cone and having one or more apertures therein, the larger end of said conical member having an enlarged annular bead formed thereon and interposed between said shoulder and said element, whereby when said member is tilted a portion of the bead remains in pivotal engagement with said shoulder while another portion of said bead moves said element for operating said valve means.

5. A fluid pressure release valve device comprising, in combination, a casing having a bore open at one end to the atmosphere, an annular shoulder carried on said casing surrounding the atmospheric opening, normally closed valve means mounted in said casing and operative to vent fluid under pressure through said bore, an apertured element having an annular flange slidably mounted in said bore, a rod disposed in engagement with said flange and in operative alignment with said valve means, and an operating member having formed thereon an annular bead of greater diameter than said shoulder, said bead being interposed between and in operative engagement with said flange and said shoulder.

6. In a fluid pressure release valve device, in combination, a casing having a bore open at one end to the atmosphere, an annular shoulder carried on said casing surrounding the atmospheric opening, normally closed valve means mounted in said casing and operative to vent fluid under pressure through said bore, means for operating said valve means including an apertured element, said element having an annular flange slidably mounted within said bore and a cylindrical portion adapted to extend concentrically within said shoulder, and an operating member comprising a hollow conical portion having apertures therein and an enlarged annular bead formed on one end thereof, said bead being interposed between said flange and said shoulder and surrounding said cylindrical portion.

7. In a fluid pressure release valve device, in combination, a casing having a chamber open at one end to the atmosphere, valve means mounted in said casing and operative to vent fluid under pressure through said chamber, mechanism for operating said valve means including an element slidably mounted within said chamber, a spring for urging said element toward a normal position and a movable operating member having an enlarged portion operatively engaging said element, and means for holding the elements of said mechanism in place comprising a bushing removably secured in the casing and having an aperture through which said operating member extends, said bushing having an annular shoulder surrounding the aperture adapted for supporting engagement with said enlarged portion of the operating member.

8. A fluid pressure release valve device comprising, in combination, a casing having a circular discharge orifice and an annular shoulder surrounding said orifice, valve means mounted in said casing and operative to vent fluid under pressure through said orifice, movable means mounted in said casing for operating said valve means, and a hollow operating member in the form of a frustum of a cone and having one or more apertures therein, said member having an enlarged annular bead on the wide end thereof interposed between and in operative engagement with said annular shoulder and said movable means, and the other end of said member having lugs through the medium of which said member may be tilted for effecting operation of the valve means.

9. In a fluid pressure release valve device, in combination, a casing having a hollow portion open at one end, a combined guide and fulcrum member open at both ends and removably attached to the open end of said hollow portion, vent valves mounted in said casing adapted to control communications through which fluid under pressure is adapted to be vented, rods contained in the hollow portion of said casing and movable longitudinally to effect the operation of said valves, a longitudinally movable element slidably guided by said casing and combined guide and fulcrum member for actuating said rods, and a lever interposed between and operatively engaging said combined fulcrum and guide member and the movable element and operative to effect the operation of said element, said lever having an operating arm extending outwardly through one of the open ends of the combined fulcrum and guide member.

EWING K. LYNN.
WALTER S. ABRAHAM.